United States Patent [19]

Sheets

[11] 3,897,646

[45] Aug. 5, 1975

[54] REACTOR APPARATUS

[76] Inventor: Wilford S. Sheets, 5323 W. Douglas, Wichita, Kans. 67209

[22] Filed: Nov. 12, 1973

[21] Appl. No.: 414,903

[52] U.S. Cl.................................... 43/15; 43/21.2
[51] Int. Cl............................................ A01k 97/10
[58] Field of Search................................. 43/15, 16

[56] References Cited
UNITED STATES PATENTS

| | | | |
|---|---|---|---|
| 2,770,906 | 11/1956 | Hood | 43/16 |
| 3,170,262 | 2/1965 | Hall | 43/15 |
| 3,591,970 | 7/1971 | Davenport | 43/15 |
| 3,672,085 | 6/1972 | King | 43/15 |

*Primary Examiner*—Warner H. Camp
*Attorney, Agent, or Firm*—John H. Widdowson

[57] ABSTRACT

A reactor apparatus for automatically hooking a fish comprising a frame, a support plate pivotally connected to the frame, a rod and reel securer connected to the support plate, a torsional spring for biasing the support plate towards a generally upright position with respect to the frame, and a trigger member pivotally attached to the frame and engaging the support plate to hold same in an essentially transverse position with respect to the frame.

5 Claims, 6 Drawing Figures

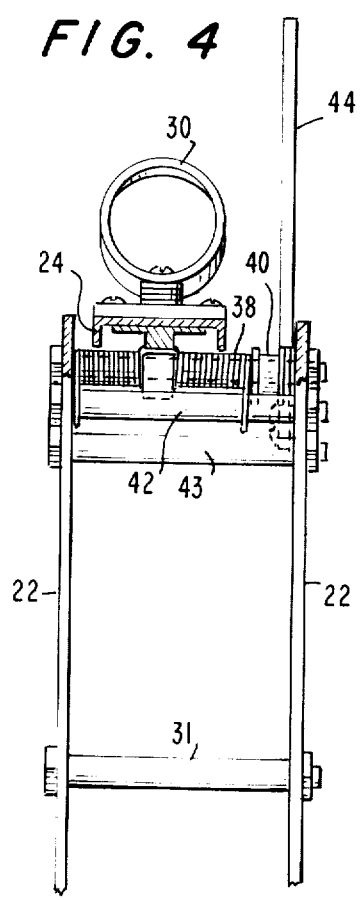
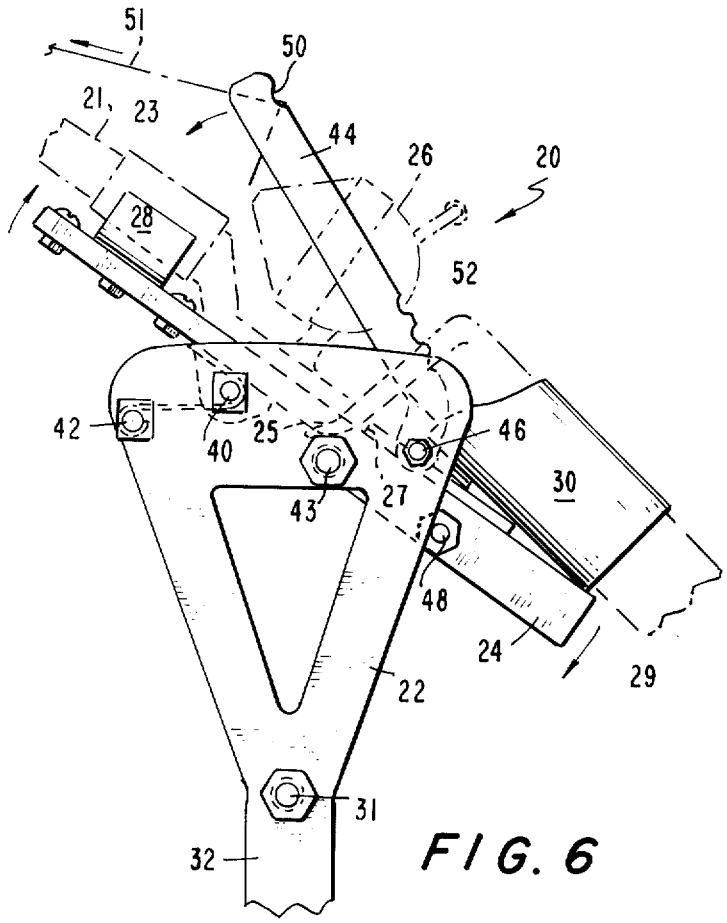
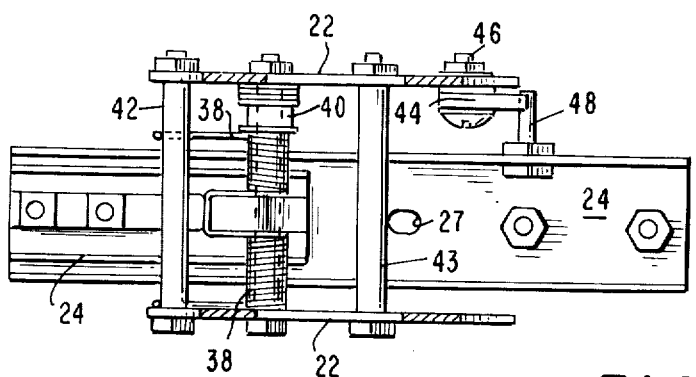

REACTOR APPARATUS

BACKGROUND OF THE INVENTION

1. Field of the Invention

This invention relates to a reactor apparatus having a rod and reel securer. More specifically, this invention provides a reactor apparatus having a rod and reel securer which automatically hooks a fish.

2. Description of the Prior Art

Conventional reactor apparatuses do not generally employ a trigger actuated by a fishing line and pivots relative to the stationary part of the support structure. Prior art devices do not utilize triggers that move with a pivotal part of the pole support; nor does the prior art provide for a torsional spring for rotating the fishing pole and mount. The majority of conventional devices use a fishing pole mount attached to a leaf spring or to a pair of opposing springs, which in use is released from a tensioned position by a cam operated latch apparatus. Their success in automatically engaging a fish has generally been unfavorable because of their unreliability. The manufacturing cost of prior art devices has become prohibitive. Therefore, what is needed and what has been invented by me is a novel reactor apparatus for automatically hooking a fish which does not include the foregoing major deficiencies.

SUMMARY OF THE INVENTION

The present invention accomplishes its desired objects by broadly providing a reactor apparatus for automatically hooking a fish comprising a frame, a support plate pivotally connected to the frame and including a first end and a second end, a means for securing a rod and reel to the support plate, a means for biasing the support plate towards a generally upright position with respect to the frame, and a trigger member pivotally attached to the frame and engaging the support plate to hold same in an essentially transverse position with respect to the frame. The reactor apparatus additionally includes a means for engaging the support plate to prevent the means for biasing the support plate towards the upright position.

It is therefore an object of the invention to provide a reactor apparatus for automatically hooking a fish that is more durable and reliable than conventional apparatuses.

It is another object of the invention to provide a reactor apparatus for automatically hooking a fish which is relatively economical to manufacture and capable of being inserted into the ground.

These, together with various ancillary objects and features which will become apparent as the following description proceeds are obtained by this novel reactor apparatus for automatically hooking a fish, a preferred embodiment being shown in the accompanying drawings, by way of example only, wherein:

BRIEF DESCRIPTION OF THE DRAWINGS

FIG. 4 is a partial side elevational view of the reactor apparatus having the rod and reel removed and taken along the line 4—4 in FIG. 2;

FIG. 5 is a partial bottom plan view of the reactor apparatus having the rod and reel removed and taken along the line 5—5 in FIG. 2; and FIG. 6 is an enlarged fragmentary front elevational view of the reactor apparatus shown in a released position after being tripped by the fishing line.

DETAILED DESCRIPTION OF THE INVENTION

Figure 1:
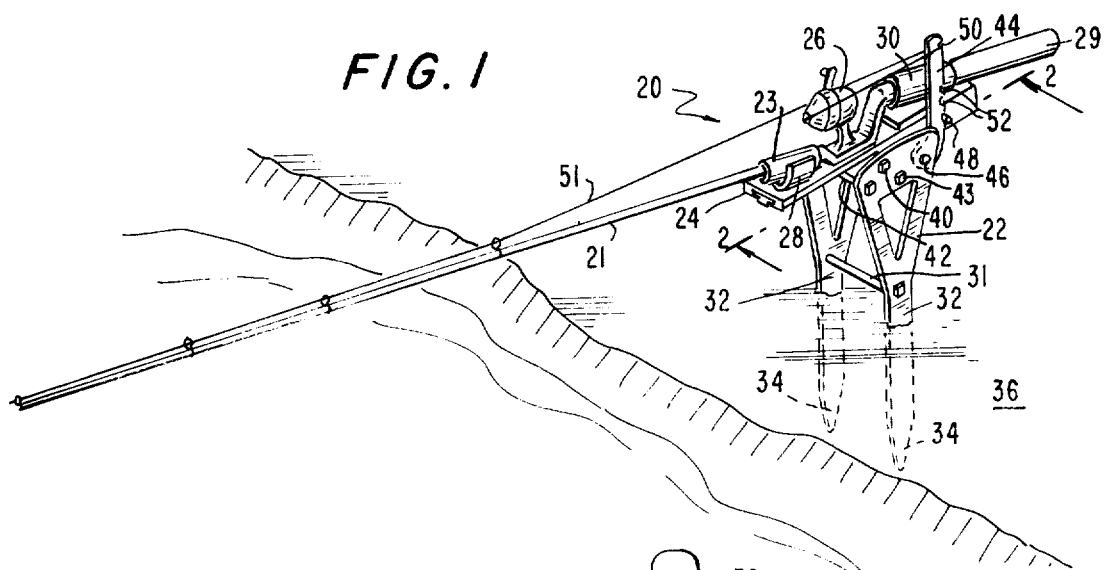
FIG. 1 is a perspective view of the reactor apparatus having a rod and reel attached thereto, cocked for release when a fish strikes, and mounted within the ground.

Referring in detail now to the drawings, wherein similar parts of the invention are identified by like reference numerals, a reactor fishing apparatus for automatically hooking a fish, generally illustrated as 20, has a frame 22 and a support plate 24 pivotally connected thereto. Frame 22 additionally has a pair of legs 32 integrally bound thereto, and legs 32 are braced by member 31 and include tapering ends 34 for insertion into a terrain 36. Support plate 24 contains at least one rod lock aperture 27. A rod 21 includes a rod tip swivel lock 23, a rod finger lock 25, and a handle 29. Reel 26 is mounted on the rod 21 which is secured to support plate 24 by inserting the handle 29, the rod finger lock 25, and the rod tip swivel lock 23, in order stated, into a substantially cylindrical shaped rod holder 30, the aperture 27, and a horseshoe shaped barrette member 28, respectively.

A resilient spring member 38 circumferentially houses a transverse support member 40 which pivotally connects to frame 22 and has support plate 24 rigidly secured thereon. A second transverse support member 42 is also rigidly secured to the frame 22 in proximity to transverse support member 24. A third transverse support member 43 attaches crosswise to the frame 22 and is positioned lower than the support member 40. Spring member 38 torsionally engages support plate 24 and support member 42 to bias support plate 24 towards a generally upright position (as shown in FIG. 6) with respect to the frame 22.

Figure 2:
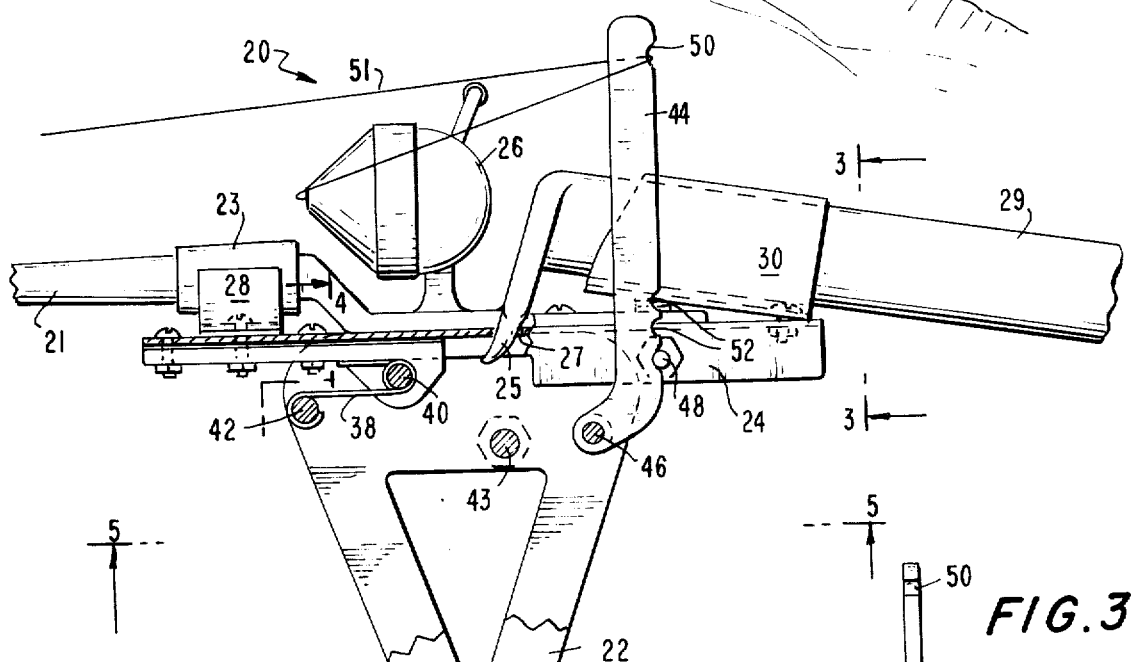
FIG. 2 is an enlarged partial vertical sectional view taken along line 2—2 in FIG. 1.
Figure 3:
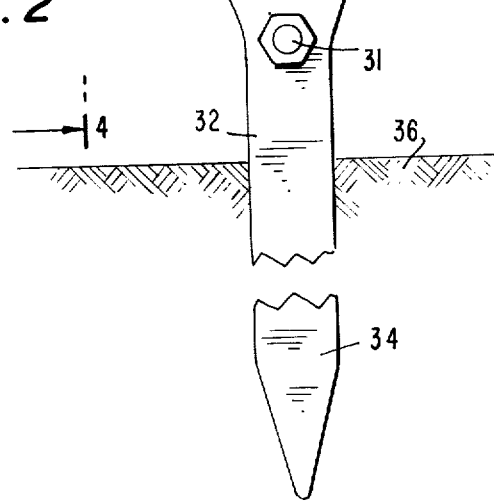
FIG. 3 is a partial side elevational view of the reactor apparatus having the rod and reel removed and taken along the line 3—3 in FIG. 2.

A trigger member 44 comprises a plurality of lower notches 52 and attaches to frame 24 at 46. A trigger pin 48 is attached to the support plate 24 and removably lodges in one of the notches 52 such as to hold the support plate 24 in an essentially transverse position (as shown in FIGS. 1-5) with respect to the frame 22. The trigger member 44 also has an upper notch 50 wherein a fishing line 51 from reel 26 lodges when the support plate 24 is held in the transverse position with respect to the frame 22.

With continual reference to the drawings for operation of the invention, legs 32 of frame 22 are inserted into the ground 36 and the barrette end of support plate 24 is manually pressed downward until trigger pin 48 can be lodged within one of the notches 52 of trigger member 44. Fishing line 51 from reel 26 is casted out and reeled in until the slack is taken out. The handle 29 of rod 21 is thereafter inserted into cylindrical shaped rod holder 30, and the rod finger lock 25 and the rod tip swivel lock 23 are subsequently inserted into aperture 27 and barrette 28, respectively. Finally, the fishing line 51 immediately leaving the reel 26 is manually wrapped behind trigger member 44 and lodged within notch 50 (as disclosed in FIGS. 1 and 2). Fishing reactor apparatus 20 is now in a cocked position with rod 21 and reel 26 mounted within. When a fish strikes a hook (not shown in the drawings) on line 51, the trigger member 44 is pulled forward (as shown in FIG. 6) to release the trigger pin 48 from within notch 52 and torsional spring 38 biases support plate 24 and the rod 21 and reel 26 mounted thereon towards an upright position until plate 24 lodges against the transverse support member 43. Support member 43 prevents torsional spring 38 from situating the support plate 24 in an upright position. The fish has now been automatically hooked. Rod 21 and reel 26 may subsequently be removed by lifting the rod tip swivel lock 23 and the finger lock 25 out of barrette 28 and aperture 27, respectively, and withdrawing the handle 29 out of the cylindrical shaped rod holder 30. The fish is presently ready to be reeled in and taken off the hook.

While the present invention has been described herein with reference to particular embodiments thereof, a latitude of modification, various changes and substitutions are intended in the foregoing disclosure, and in some instances some features of the invention will be employed without a corresponding use of other features without departing from the scope of the invention as set forth.

I claim:

1. A reactor apparatus for automatically hooking a fish, comprising:
   a. a frame having a pair of sides in a spaced relation and a pair of legs integrally bound to said sides for in use supporting said frame on the terrain,
   b. a rod support means has a first transverse support member mounted between sides of said frame pivotally mounting a rod support member between said sides, a second transverse support member is rigidly mounted between sides of said frame in proximity to said first transverse support member, said rod support member including a first end and a second end and having a means for securing a rod and reel to said rod support member,
   c. means cooperating with said rod support member and said frame for biasing said rod support member towards a generally upright position,
   d. a trigger means having a first trigger member pivotally attached to one side of said frame and having means to engage a fishing line, said means to engage a fishing line is a notch in said trigger member wherein the fishing line from said reel lodges when said rod support member is held in an essentially transverse position with respect to said frame, a trigger pin member rigidly mounted on said rod support member, and extending therefrom, said trigger member having means removably engagable with said trigger pin member, said trigger member being constructed and adapted to in use be disengaged from said trigger pin member by tension in said fishing line, said trigger means being constructed and adapted to in use hold said rod support member in said essentially transverse position with respect to said frame with said trigger member engaged with said trigger pin member and upon disengagement of said trigger member from said trigger pin member releasing said rod support member to move toward said generally upright position, and
   e. a third transverse support member mounted crosswise between said frame sides and positioned lower than said first support member for engaging said rod support member to prevent said means for biasing said rod support member towards the upright position from situating said rod support member in an upright position.

2. The reactor apparatus of claim 1 wherein said means for biasing is a resilient spring member, said spring member circumferentially houses said first support member and torsionally engages said rod support member and said second support member.

3. The reactor apparatus of claim 1 wherein said trigger member means includes a plurality of lower notches in one of which said trigger pin removably lodges when said rod support member is held in said essentially transverse position with respect to said frame.

4. The reactor apparatus of claim 1 wherein said means for securing comprises a substantially cylindrical shaped rod holder attached to said second end of said rod support member, and an essentially horseshoe shaped barrette member connected to said first end of said rod support member.

5. The reactor apparatus of claim 4 wherein said pair of legs have tapering ends.

* * * * *